United States Patent
Beurteaux et al.

[11] Patent Number: 5,890,768
[45] Date of Patent: Apr. 6, 1999

[54] LEG ATTACHMENT SYSTEM AND METHOD FOR SEATS

[75] Inventors: Rodney William Beurteaux, East Fremantle; Kenneth William Beurteaux, Bicton; William Bailey, West Pennant Hills; Colin Edward Hill, Munster, all of Australia

[73] Assignee: Beurteaux (Australia) Pty Ltd., Henderson, Australia

[21] Appl. No.: 836,491

[22] PCT Filed: Nov. 15, 1995

[86] PCT No.: PCT/AU95/00795

§ 371 Date: Sep. 2, 1997

§ 102(e) Date: Sep. 2, 1997

[87] PCT Pub. No.: WO96/15025

PCT Pub. Date: May 23, 1996

[30] Foreign Application Priority Data

Nov. 15, 1994 [AU] Australia .................. PM9450

[51] Int. Cl.⁶ .................................................. B60N 2/44
[52] U.S. Cl. .................. 297/463.1; 248/501; 296/63; 297/216.1; 297/216.16; 244/122 R
[58] Field of Search .................. 297/463.1, 216.1, 297/216.16; 248/501, 502; 296/63; 244/122 R

[56] References Cited

U.S. PATENT DOCUMENTS

| | | | |
|---|---|---|---|
| 3,392,954 | 7/1968 | Malitte | 248/501 X |
| 3,462,105 | 8/1969 | Kohrt | 248/501 X |
| 3,620,171 | 11/1971 | Brenia et al. | |
| 4,114,947 | 9/1978 | Nelson | 248/503.1 X |
| 4,638,546 | 1/1987 | Benshoof | 296/63 X |
| 4,732,359 | 3/1988 | Danton | 296/63 X |
| 4,927,201 | 5/1990 | Froutzis | 296/63 |
| 5,527,080 | 6/1996 | Wahlqvist | 296/63 |
| 5,624,098 | 4/1997 | McDowell | 248/501 X |

FOREIGN PATENT DOCUMENTS

| | | |
|---|---|---|
| A-74007/87 | 12/1988 | Australia . |
| 0 586 291 A1 | 8/1993 | European Pat. Off. . |
| 2401794 | 4/1979 | France ................... 296/63 |

*Primary Examiner*—Peter M. Cuomo
*Assistant Examiner*—Rodney B. White
*Attorney, Agent, or Firm*—Holland & Hart LLP

[57] ABSTRACT

A system to attach seats, in particular rows of lightweight seats to the light gauge deck of a high passenger marine craft. Horizontal flanges of aluminum angles (23) form a T-shaped foot locking within cavity (35) of track (29) fixed to the deck. High tensile tie straps (27a, 27b) are held between the vertical webs of the angles (23) by pins (69). A tubular pedestal (25) has upper recesses (49) which mate with a box beam supporting the seats. Threaded studs (73) of the tie straps (27a, 27b) are bolted to the box beam so that inertial forces arising in the event of an impact of the craft will be uniformly distributed by the pedestal, tie straps (27a, 27b), and angles (23), to the track for dissipation over an extended length of track, thus reducing the effects of localized shear. On assembly of the system, the angles (23) need not to be slid along the track but may be inserted individually being later spaced apart by insertion of tie straps (27a, 27b) so as to laterally the cavity (35).

16 Claims, 13 Drawing Sheets

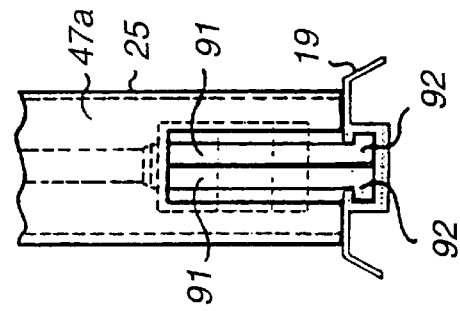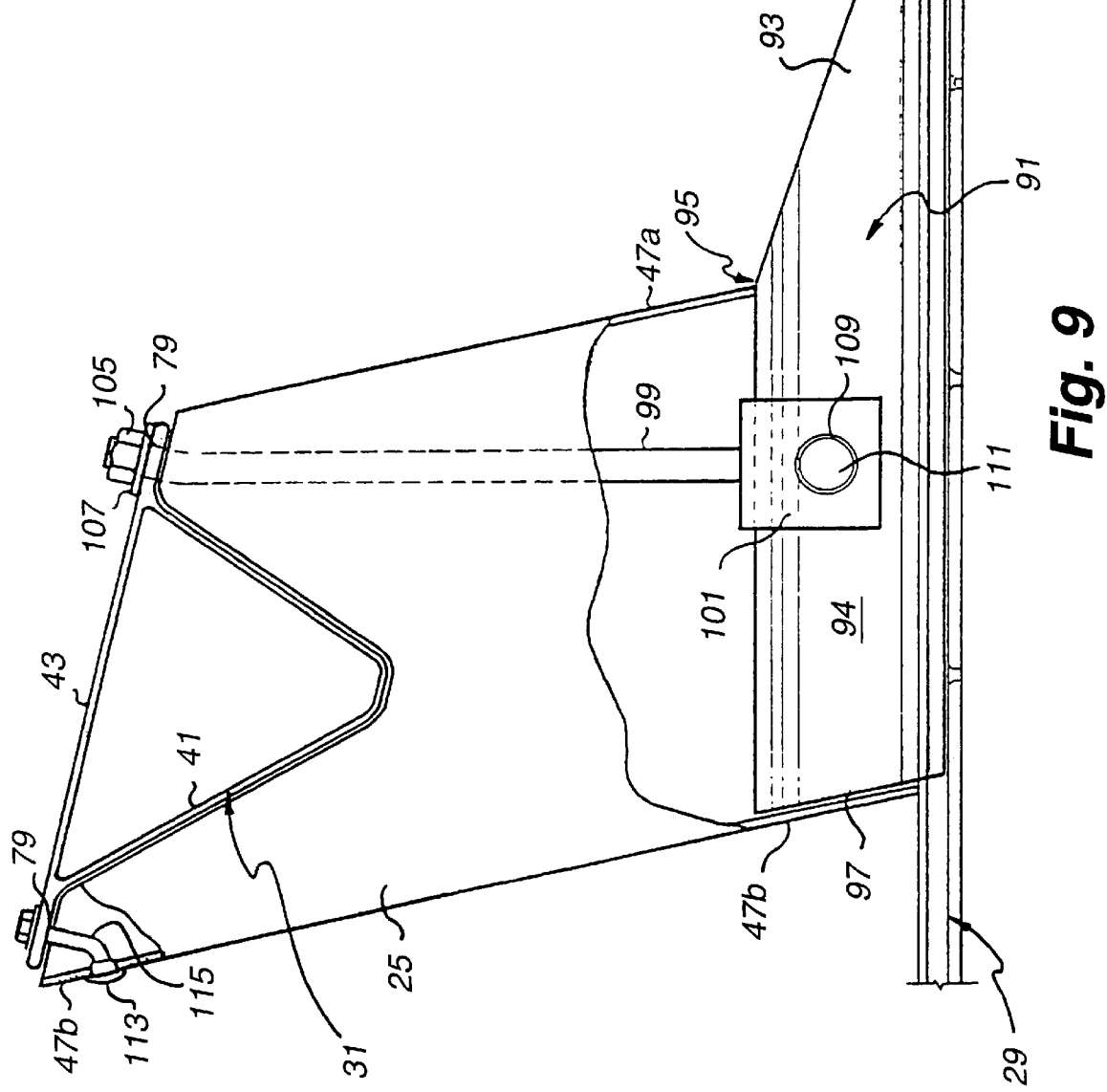

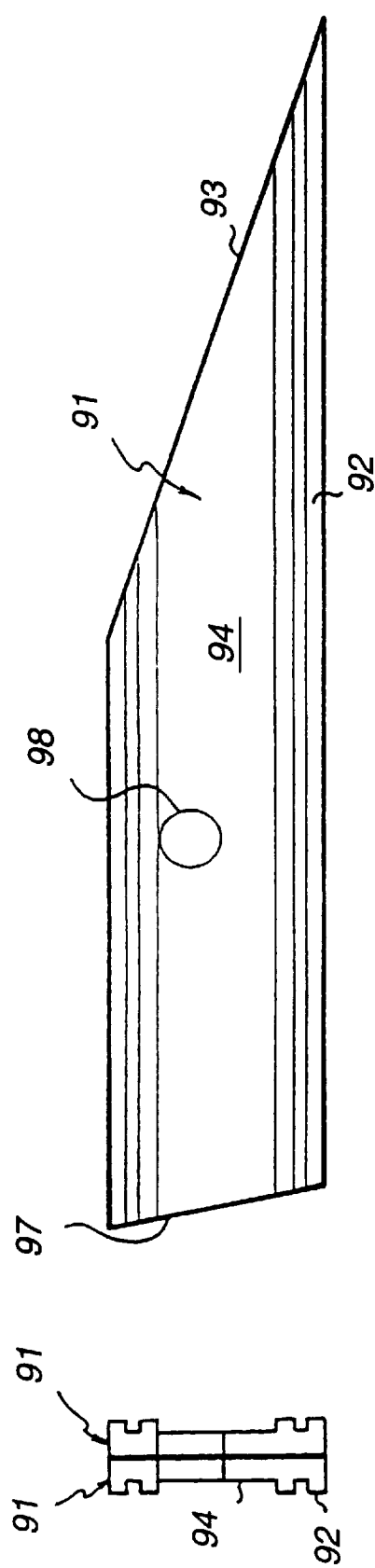
Fig. 11
Fig. 12
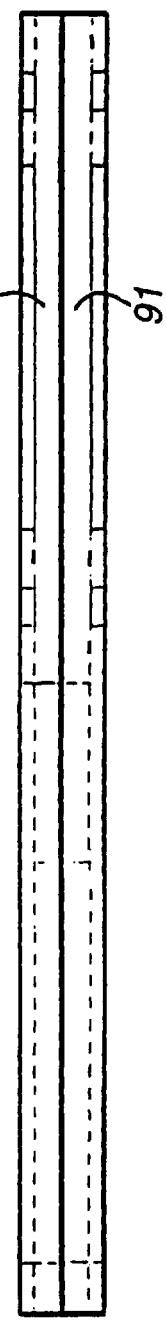
Fig. 13

LEG ATTACHMENT SYSTEM AND METHOD FOR SEATS

TECHNICAL FIELD

This invention relates to a leg attachment system and method for seats attached to a seat support.

The invention has particular utility to the mounting of seats to the floor of a vehicle or the deck of a vessel where the seats of the vehicle or vessel can be subjected to an appreciable lateral force when the motion of the vehicle or vessel is suddenly impeded.

The invention, however, is not limited to such application and has general utility as an attachment system for pedestals or standards of any general form which are required to be anchored to a floor and which may be subject to the application of a lateral force.

BACKGROUND ART

In recent times, and with the application of new technologies, large passenger carrying marine craft are achieving speeds of a magnitude normally experienced in motor vehicles and so are capable of subjecting passengers seated within them to high lateral forces which can cause serious injury if the motion of the vessel is suddenly impeded.

One of the problems with designing leg attachment systems for seating in marine vessels, and which does not present itself to the same degree in relation to land based vehicles, is the weight consideration which seriously affects the design of the particular leg attachment system that is adopted. Moreover, in order to achieve high speeds, passenger ferry craft are required to be light weight, whereby the weight of the vessel directly affects the maximum speed that can be obtained by the vessel. Consequently, passenger ferry craft these days are constructed with decks of extremely light gauge material, for example aluminium sheeting which can reach thicknesses of down to 2 mm. Consequently, the leg attachment systems that have previously been designed for seating to attach to decks of such light gauge material have similarly been of light weight design and hence have skimped on meeting minimum safety standards for resisting laterally applied impact forces.

An immediate solution to the problem would be to make leg attachment systems of heavier gauge material, however the inherent problem with this is that this would considerably add to the weight of the vessel.

A further problem is that the beam of marine craft is not limited to the same extent as the breadth of land based vehicles and hence there is much more flexibility in the positioning and the number of seats that are able to be mounted upon a deck than is the case with land based motor vehicles. Hence, the ability to position seats easily and removably is also an important design consideration which detracts from having permanent fixed point anchoring systems for leg attachment systems, which are easier to design for meeting high loading requirements than is the case of impermanent anchoring points and fixtures.

Present types of anchoring techniques for leg attachment systems are basically divided into three classes. The first is the flange or base plate anchoring system as shown in FIG. 1A of the accompanying drawings, the second is the block mounted anchoring system as shown in FIG. 1B of the drawings, and the third is the track mounted anchoring system using either diamond or T-head bolts (not shown) or angle bolts shown in FIG. 1C.

As shown in FIG. 1C, this system uses an interlocking angle 'a' to which tie bolts 'b' are fixedly mounted to fixedly retain a seat pedestal leg 'c' to a track 'd'. The track 'd' itself is permanently fixed to the deck and is formed with a longitudinally extending cavity, centrally disposed within and circumscribed by a C-shaped channel portion 'e'. Such an arrangement has the advantage that the interlocking angle can be positioned close to the installation site without having to be slid along the entire length of deck track, which would otherwise be the case if a captive T-head section was used. Although a T-head section would provide greater locking ability and hence strength, as lengths of track can be as long as 50 m or more along a deck, such a system is impractical to use.

The first two of these systems falls into the category of permanent affixture anchoring points and is not attractive to the industry due to the inability to change the fixing position of the leg attachment for the seats, once it is fixed in position. A further problem is that almost all of the impact force is directly transferred to the deck of the vessel at the fixing point of the bolts, in the case of the flange or base plate arrangement, and the blocks, in the block mounted arrangement. Such forces consequently impose considerable shear upon the deck itself and in the case of lightweight thin gauge deck construction, the anchoring systems are able to pull out directly from the deck at relatively low impact forces, causing permanent damage to the deck itself.

The track arrangement, however, is generally accepted as the industry standard, whereby the track system allows for easy and impermanent positioning of the anchoring means therealong, whilst causing the impact forces to be applied to the track itself rather than the deck. Accordingly, the track system allows the leg attachments for seats to be easily slid into position, and the track itself can be attached to the deck using various fixing systems, including rivet and nut inserts which allow forces transmitted to the track to be more uniformly spread along the deck, reducing shear. In addition, the track provides a continuous attachment method for the leg attachments of the seats to the deck, where the leg attachments can be adjustably positioned at any time by sliding the legs in the track to the correct position.

Notwithstanding this improved arrangement, the two types of anchoring systems used with the track arrangement, namely the diamond or T-head bolt anchoring system or the angle bolt anchoring system, have been found to be limited with respect to the size of the impact force that can be accommodated and fall short of the standards recently set by the International Maritime Organisation which are applicable to high speed passenger carrying vessels.

Moreover, in the case of the diamond or T-head bolt arrangements, impact forces are still transmitted by the anchoring system to the track at point locations, consequently causing shearing of the anchoring means from the track at these points. In the case of the angle bolt attachment system, although impact forces are applied more uniformly along the angle, due to the limited ability of the angle to lock into the cavity of the C-shaped channel design of the track, the angle itself has a tendency to pull out or shear from the track by the impact force, creating a bending moment around the flange or lip 'f' of the track which engages the flange of the angle.

Safety standards imposed by the International Maritime Organisation are calculated in accordance with a vessel's "G" rating. Moreover, each type of vessel has a "G" rating associated therewith which equates to the likely inertial forces that may be applied to passengers, having regard to the vessel size, its speed and weight.

"G" ratings for most large passenger carrying marine craft require leg attachment systems to resist impact forces in the region of 600 kg. With respect to the previously described prior art leg attachment systems, impact force resistance of only 300 kg to 400 kg can be achieved before experiencing vertical separation of the leg attachment from the deck or the track.

DISCLOSURE OF INVENTION

Accordingly, it is an object of the present invention to provide an improved leg attachment system which overcomes some or all of the disadvantages associated with prior art leg attachment systems as described above, and which in particular provides for opposing and dissipating impact forces of a magnitude to meet recent standards adopted by the International Maritime Organisation.

In accordance with one aspect of the present invention, there is provided a leg attachment for seats mounted to a seat support, including:

an anchoring means for lockingly engaging a base having a track therein, said base being fixedly mounted to a support;

leg means for surmounting said anchoring means and supporting a seat support thereon; and tie means for released fixed attachment to said anchoring means at one end and clamped locking engagement to the seat support at the other end, such that increased locking engagement of said tie means with the seat support positively locks said leg means to said anchoring means;

wherein lateral forces applied to the seat support are transferred by said leg means and said tie means to said anchoring means, whilst simultaneously being disseminated through said leg means;

and wherein said anchoring means is adapted to dissipate the force transferred thereto uniformly over an expansive portion of the track base Preferably, said anchoring means comprises a pair of interlocking angles, each having an outer flanged end, for being positively engaged within a longitudinally extending cavity centrally disposed within and circumscribed by a C-shaped channel portion of the track, and a substantially planar web portion for projecting outwardly from the cavity; wherein said flanged ends combinedly define a T-shaped foot for locking engagement within the cavity and said web portions define a leg for attachment to said tie means, when said interlocking angles are brought into juxtaposition with each other.

Preferably, the combined transverse extent of said flanged ends is marginally less than the corresponding maximal transverse extent of the cavity, and the combined transverse extent of the web portions proximate to said foot is marginally less than the minimal transverse extent of the cavity, so that said interlocking angles are required to be transversely spaced apart a prescribed distance to fully occupy and engage said cavity when in said juxtaposition, to enable one interlocking angle to be discretely withdrawn from engagement with the track by lateral rotation thereof relative to the other interlocking angle.

Preferably, said web portions are each provided with a corresponding transversely extending aperture to facilitate attachment to said tie means.

Preferably, said leg means comprises a tubular pedestal having a base end for sitting upon the track whilst surmounting said anchoring means, and an opposing support end formed with a transversely extending recess of complementary shape to the seat support to accommodate a longitudinal portion of the seat support, transversely across said pedestal.

Preferably, said tie means comprises a shank portion for extending along and within said tubular pedestal, said one end having a transversely extending aperture for aligning with corresponding apertures of said anchoring means to facilitate attachment thereto.

Preferably, said other end of said tie means is formed with a screw threaded fastening means for locating within a corresponding aperture disposed upon the support beam and for clampingly and lockingly engaging the seat support positively upon said tubular pedestal within said recess on increased locking engagement of said fastening means upon the seat support.

Preferably, said one end is able to be releasedly pinned to said anchoring means by means of a pin inserted through the corresponding apertures of said web portions and said one end when brought into relative axial alignment.

Preferably, said shank portion comprises a strap of commensurate transverse extent at said one end to said prescribed distance for being disposed interposedly between said web portions, so as to maintain locking engagement of said foot with the track.

In accordance with another aspect of the present invention, there is provided a leg attachment system for seats mounted to a seat support, comprising:

a base having a track for fixed mounting to a support; and a leg attachment including:
(i) an anchoring means for lockingly engaging said track;
(ii) leg means for surmounting said anchoring means and supporting a seat support thereon; and
(iii) tie means for released fixed attachment to said anchoring means at one end and clamped engagement to the seat support at the other end, such that increased locking engagement of said tie means with the seat support positively locks said leg means to said anchoring means;

wherein lateral forces applied to the seat support are transferred by said leg means and said tie means to said anchoring means, whilst simultaneously being disseminated through said leg means;

and wherein said anchoring means is adapted to dissipate the force transferred thereto uniformly over an expansive portion of said base.

In accordance with another aspect of the present invention, there is provided a method of forming a demountable leg attachment system for seats, comprising:

fixedly mounting a base having a track therein to a support;

inserting anchoring means into said track to lockingly engage therewith;

releasedly attaching tie means to said anchoring means, so that said tie means can project upwardly therefrom;

surmounting a leg means for supporting a seat support, over said anchoring means so that said tie means is disposed within the confines of the leg means and can extend therealong;

positioning a seat support upon the top of said leg means and locating the ends of said tie means to extend through said seat support;

clampingly engaging said seat support to said leg means by locking engagement of said tie means with said seat support, and consequently clampingly engaging said leg means upon said track;

wherein lateral forces applied to said seat support are transferred by said leg means and said tie means to said anchoring means, whilst simultaneously being disseminated through said leg means;

and wherein forces transferred to said anchoring means are dissipated uniformly over an expansive portion of said base.

In this manner, leg attachments and hence seats can be positioned at any location along long lengths of deck track without having to slide captive T sections from one end, whilst maintaining maximum resistance to vertical separation of the anchoring system from the track.

BRIEF DESCRIPTION OF DRAWINGS

The invention will be better understood in the light of the following description of three specific embodiments thereof. The description is made with reference to the accompanying drawings, wherein:

FIG. 9 is a fragmentary sectional side view of a fully assembled leg attachment system in accordance with the third embodiment;

FIG. 10 is a sectional end view of the leg attachment system shown in FIG. 9;

FIG. 11 is a side elevation of the pair of flanged plates in accordance with the third embodiment;

FIG. 12 is an end view of the flanged plates shown in FIG. 11;

FIG. 13 is a plan view of the flanged plates shown in FIG. 11;

FIG. 16b is a plan view of FIG. 16a;

FIG. 18b is an end view of 18a; and

SPECIFIC EMBODIMENTS OF THE INVENTION

Figure 1:
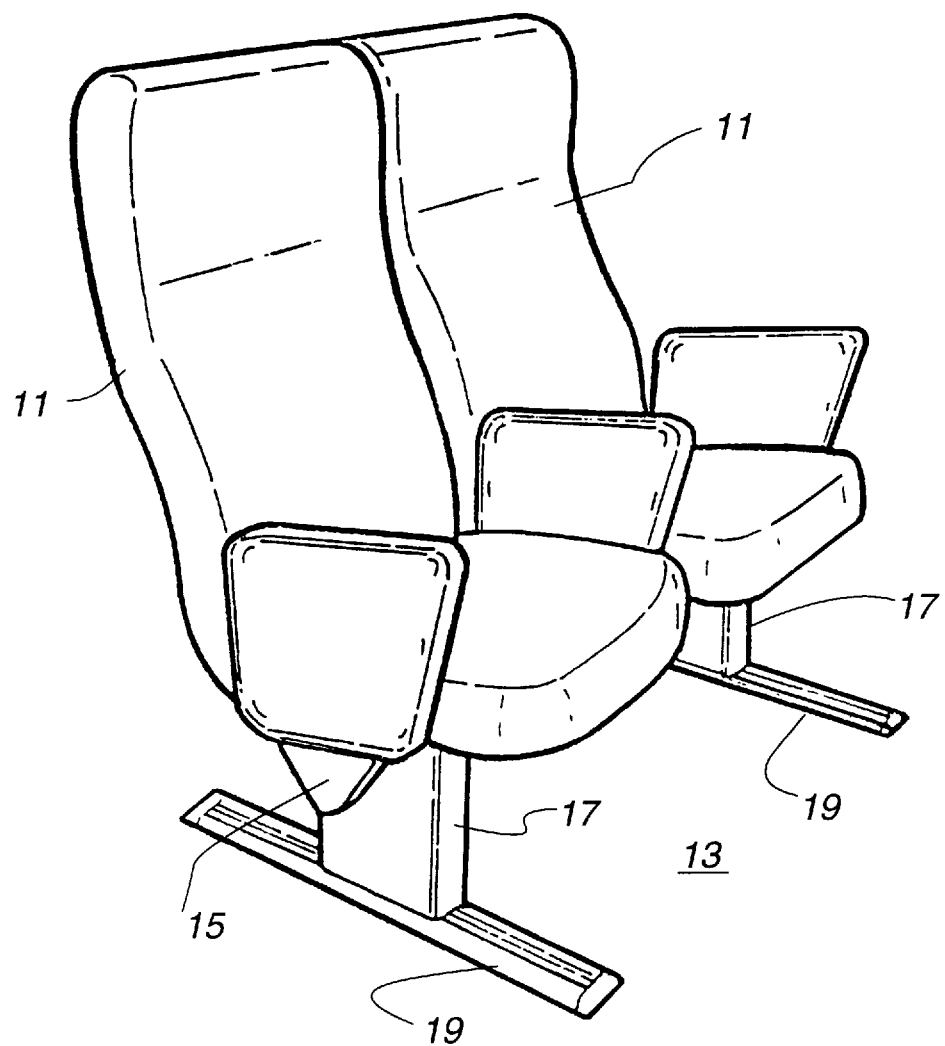
FIGS. 1 and 1a–1c is a perspective view showing a pair of seats mounted upon the leg attachment system of the present invention.

In the description of the embodiments and drawings associated therewith, the same reference numerals have been used to identify common features of the embodiments.

As shown in FIG. 1 of the drawings, all of the embodiments are directed towards a demountable leg attachment system for attaching rows of lightweight seats 11 to the deck 13 of a high speed passenger marine craft, via a seat support beam 15 which has the seats fixedly attached thereto. The beam 15 is supported by two or more pedestal legs 17 which are in turn lockingly engaged with respective bases 19 comprising tracks which run longitudinally and are fixedly attached to the deck 13 of the vessel.

The first embodiment is directed towards a demountable leg attachment system 21 comprising an anchoring means in the form of a pair of interlocking angles 23, leg means in the form of a tubular pedestal 25, tie means in the form of a 15 pair of tie straps 27, a base comprising a track 29 and a seat support beam 31.

The track 29 is of the conventional extruded aluminium form having a C-shaped channel portion 33 centrally disposed therein and defining and circumscribing a longitudinally extending cavity 35 therein. The track 29 is also provided with a pair of outwardly projecting longitudinally extending flanges 37, each having a proximal planar portion 37a and a downturned distal portion 37b. The proximal portions 37a respectively define inwardly projecting flanges or lips 39 which are spaced apart a prescribed distance in opposing relationship to define an opening into the cavity 35 of the track. The distal portions 37b have a downward extent commensurate to the height of the C-shaped channel to engage the deck lining in conjunction with the bottom of the C-shaped channel 33 which engages the deck itself. Accordingly, the distal portions 37b provide a clean finish for carpet or other deck covering which terminates adjacent to the channel 33.

The track 29 is fixedly attached to the deck by screws, rivets, welding or other fastening arrangement.

The seat support beam 31 is also of conventional extruded aluminium form, comprising a trapezial box channel portion 41 and a planar flanged mounting portion 43, contiguous with the long and parallel side of the channel portion.

The opposing sides of the mounting portion 43 comprise longitudinally extending flanged ends 43a to facilitate attachment to the leg attachment system in a manner to be described later.

The mounting portion 43 provides a surface to which the seats 11 are fixedly mounted by a nut and bolt fastening arrangement or the like and the boxed channel portion 41 is disposed to depend from the mounting portion 43 to surmount the pedestal 25. Accordingly, the support beam 31 is disposed transversely of a series of seats 11 disposed side by side as shown in FIG. 1 of the drawings for attachment thereto.

The tubular pedestal 25 is of substantially rectangular extruded aluminium form having a pair of opposing side panels 45 which are interconnected by a pair of opposing end panels 47. The opposing axial ends of the pedestal are terminated in planes which are obliquely disposed relative to the axial extent of the pedestal so that the top of the pedestal projects forwardly when seated upon its base end and the top end is inclined downwardly towards the rear of the pedestal.

The side panels 45 have corresponding recesses 49 formed therein of complementary shape to the trapezial box channel portion 41 in section so that the support beam 31 can be accommodated therein in a transverse relationship with respect to the pedestal. The recesses 49 are centrally disposed between he end panels 47 and terminate marginally therefrom to define a pair of opposing end landings 51a and 51b which provide a seat for the opposing flanged ends 43a and 43b of the seat mounting portion 43.

The corners of the panels 45 and 47 are truncated so that the longitudinal sides 48 of both end panels function to facilitate locating the pedestal 25 laterally relative to the tie straps 27 to enable the pedestal to be locked centrally upon the track 29 in a manner that should become apparent later. This facility is of more importance to the second embodiment and will be described in more detail in relation to that embodiment.

The posterior end panel 47a has a rectangular aperture 50 formed therein which is disposed a prescribed distance from the bottom end of the pedestal to enable interlocking engagement with the interlocking angles in a manner to be described later. The anterior end panel 47b is formed with a rectangular recess 52 at the bottom end of the pedestal which extends along the end panel a prescribed distance from the bottom edge to terminate at a prescribed height above the bottom end of the pedestal corresponding to the tope of said interlocking angles thereat. Accordingly, the recess 52 is sized to accommodate the interlocking angles 23 in a position so that the pedestal 25 can surmount both the angles simultaneously with the bottom end of the pedestal sifting symmetrically upon the proximal planar portion 37a of the track.

The interlocking angles 23 are formed of aluminium plate and each are provided with a longitudinally extending flanged end portion 53 and an elongated web portion 55. The length and height of the angles 23 is determined in accordance with impact force resistance calculations, and in the present embodiment, the length is longer than the distance between the end panels 47 of the pedestal 25. The posterior end 57 of the interlocking angles 23 is obliquely angled relative to the longitudinal extent of the flanged end portions 53 and is parallel with the panel ends 47 of the pedestal 25, when the pedestal is correctly disposed upon the track 29.

Figure 3:
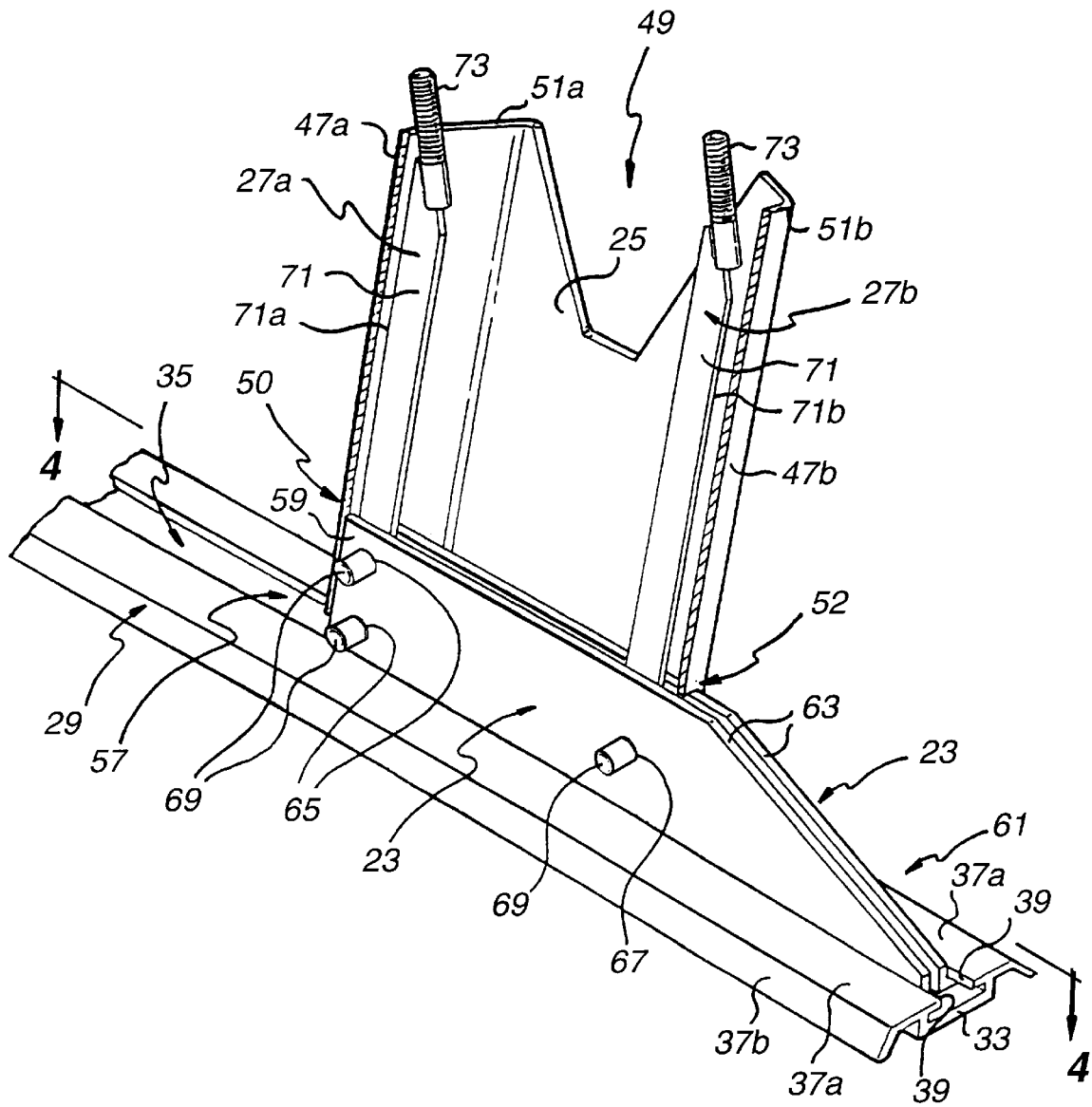
FIG. 3 is a fragmentary perspective view showing the leg attachment system of the first embodiment.
Figure 4:
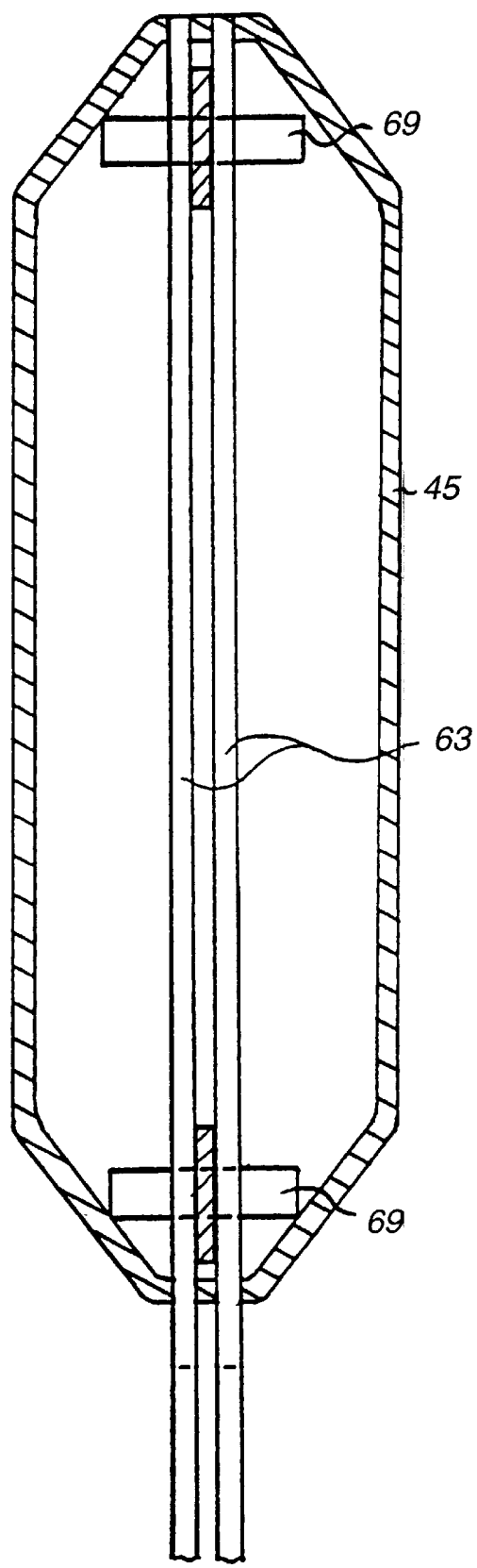
FIG. 4 is a top sectional view of the leg attachment taken along section 4—4 of FIG. 3.

As shown in FIG. 3 of the drawings, the posterior end 57 is stepped to define an outwardly projecting tongue 59 which is correspondingly sized to repose within the posterior aperture 50 of the pedestal. The anterior ends 61 of the interlocking angles 23 are each tapered from the posterior end 57 a distance marginally greater than the distance between the end panels 47 of the pedestal. The tapering is provided to reduce on the amount of material involved with forming the interlocking angles 23, without unduly sacrificing on strength, and furthermore mitigates the obtrusive nature of the interlocking angles 23 extending anteriorly of the leg attachment system, and avoids the presence of any sharp edges on which people may catch themselves moving to or from the seats.

The web portions 55 are provided with a plurality of apertures which extend transversely therethrough and which are correspondingly aligned when the angles are disposed in juxtaposed corresponding relationship with each other. Two of the apertures 65 are disposed towards the posterior end 57 of the interlocking angles 23 and one aperture 67 is disposed intermediate of the web portion 55 a prescribed distance from the aperture 65 which is less than the spacing between the end panels 47.

Importantly, the flanged ends 53 of the interlocking angles 23 define a T-shaped foot for locking engagement within the cavity 35 when the flange plates are brought into juxtaposition with each other. Further, the combined transverse extent of the flanged ends 53 is marginally less than the corresponding maximal transverse extent of the cavity 35. In addition, the combined transverse extent of the web portions 55, proximate to the foot, is marginally less than the minimal transverse extent of the cavity which corresponds to the opening disposed between the lips 39 of the track 29. The significance of this will be described in further detail later.

The tie straps 27 are formed of an appropriate high tensile steel and comprise a shank portion 71 and a threaded bolt stem 73 connected thereto. The bottom end of the shank portion is obliquely angled relative to the longitudinal axis of the strap for engaging the bottom of the C-shaped channel portion 33 of the track 29. The bolt stem 73 is welded to the other end of the shank portion and forms part of a screw threaded fastening means for affixing to the support beam 31. The other part of the fastening means comprises bolt fasteners 75 and washers 77 which are corresponding sized to screw upon the threaded bolt stems 73.

The length of the shank portion 71 is marginally less than the length of the pedestal 45 and the bolt stems 73 project longitudinally from the outer ends of the shank portion 71 at an attitude which is orthogonal to the plane of the top end of the pedestal, defined by the landings 51a and 51b when correctly positioned within the pedestal.

The bottom ends of the shank portions 71 are provided with apertures (not shown) to align with the apertures 65 and 67 of the interlocking angles 23 respectively. Moreover, the posterior tie strap 27a is intended to be disposed towards the rear of the pedestal 25 and is provided with two apertures which are disposed along the shank portion 71 at corresponding distances from the bottom end of the shank portion as are the rear apertures 65 relative to the bottom of the interlocking angles 23. In this manner, the apertures 65 and the corresponding apertures of the posterior tie strap 27a can be aligned in position when the tie strap 27a is disposed within the cavity 35, together with the interlocking angles 23.

The anterior tie strap 27b is intended to be disposed towards the front of the pedestal 25 and is provided with an aperture disposed along the shank portion 71 thereof at a corresponding distance from the bottom end of the shank portion as are the apertures 67 relative to the bottom of the interlocking angles 23 thereof. Consequently, the corresponding aperture 67 and the aperture of the tie strap 27b can be aligned when the tie strap 27b is disposed in the cavity 35 in conjunction with the interlocking angles 23.

Accordingly, the apertures 65 and 67 of the interlocking angles are correspondingly sized with respect to the apertures of the tie straps 27 so that when aligned, respective pins 69 are able to be inserted through the web portions and the straps transversely to releasedly pin the straps to the angles.

The relative positioning of the apertures 65 and 67 along the interlocking angles 23 is precisely determined so that the rear longitudinal edge 71a of the posterior tie strap 27a is disposed in corresponding angular relationship relative to the track 29 as is the posterior end panel 47 of the pedestal when the pedestal 25 is mounted on the track itself. That is, the rear longitudinal edge 71a of the tie strap is disposed in parallel relationship to the end panel 47.

Further, the relative longitudinal spacing of the apertures 65 and 67 along the web portions 55 is such that when the tie straps 27 are pinned to their corresponding apertures, and the anterior tie strap 27b is disposed in parallel relationship to the posterior tie strap 27a, the distance between the rear longitudinal edge 71a of the posterior tie strap 27a and the anterior longitudinal edge 71b of the anterior tie strap 27b is commensurate to the spacing between the end panels 47 of the pedestal. Further, the combined transverse extent of the web portions 55, as spaced apart by the tie straps 27, is commensurate to the transverse extent of the end panels 47 between the longitudinal sides 48 thereof, and the longitudinal extent and spacial positioning of the pins 69 is similarly commensurate to the corresponding transverse extent of the adjacent portions of the truncated corners of the pedestal 25. In this manner, the pedestal 25 can be fitted upon the assembled tie straps and interlocking angles to surmount the angles and automatically align the tie straps 27 in parallel and juxtaposed relationship with the end panels 47 of the pedestal, as well as symmetrically locate upon the track 29 and lock in the pins and interlocking angles in position.

The bolt stems 73 consequently are disposed apart in parallel relationship a prescribed distance, when the tie straps are assembled into position. This enables correspondingly spaced bolt holes 79 to be disposed within the opposing flanged ends 43a of the support beam 31 and the bolt stems 73 to be inserted therethrough when the support beam 31 is correctly positioned upon the pedestal 25.

Consequently, the support beam 31 can be positively locked into position on the pedestal 25 by screwing the nut fasteners 75 together with washers 77 onto the threaded bolt stems 73.

Figure 5A:
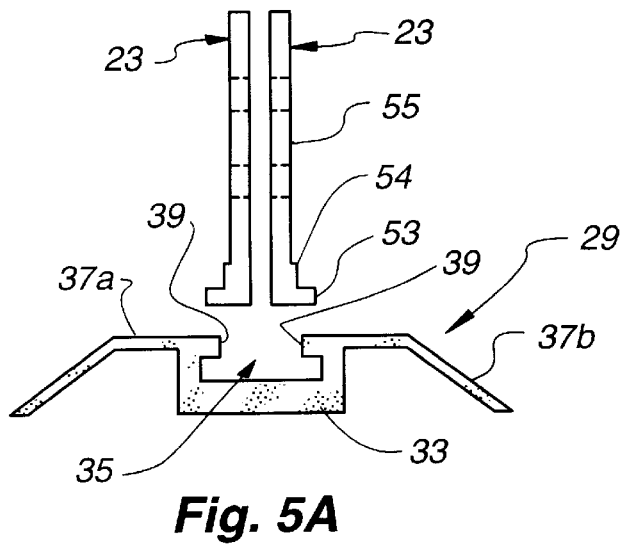
FIGS. 5a, 5b, 5c and 5d are a set of sectional end views showing the method by which the anchoring means and tie means are inserted into a track to form part of the leg attachment system in accordance with the first embodiment.
Figure 5B:
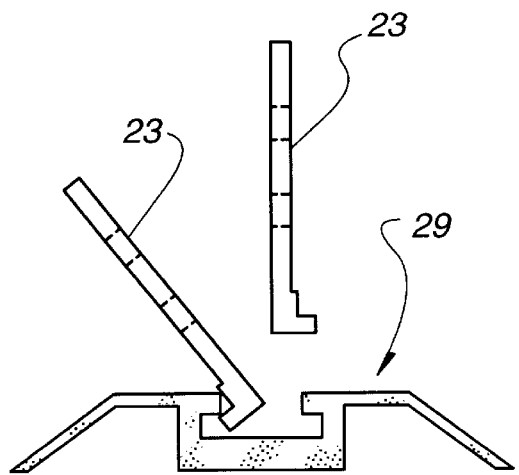
Figure 5C:
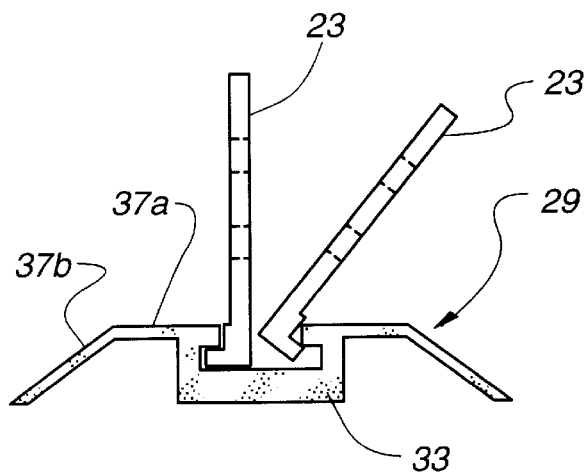

Now describing the method of assembling the leg attachment system, the interlocking angles 23 are inserted into the track one at a time, as shown in FIGS. 5b and 5c by disposing the flanged end 53 of an angle in parallel alignment with the cavity 35, and hooking the flanged end 53 under the corresponding lip 39 of the track, rotating the plate around the lip as is necessary. Accordingly, the thickness of the web portions 55 and the dimensioning of the C-shaped channel portion needs to be such as to allow sufficient clearance between the angles to allow this discrete hooking engagement with the corresponding lip, whilst the other angle is disposed in its locking position, as shown in FIG. 5c of the drawings.

Figure 5D:
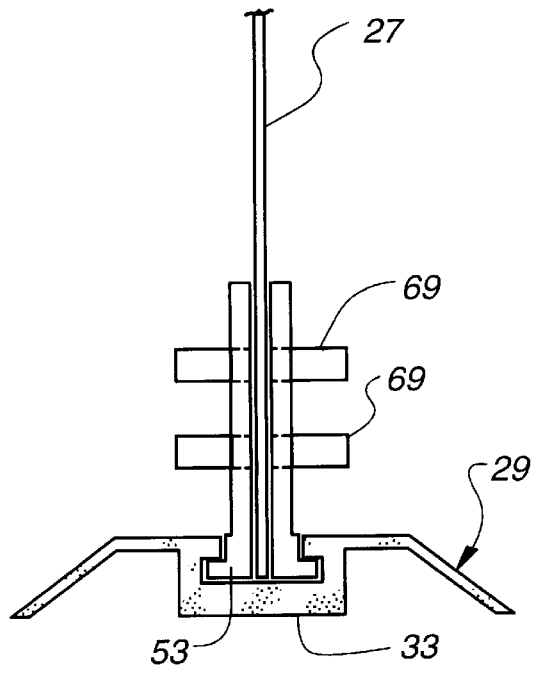

After both plates 23 are engaged within the track, they are transversely spaced apart a distance commensurate to the thickness of the bottom ends of the shank portions 71 of the tie straps 27. Accordingly, the flanged ends 53 may be provided with a stepped edge 54 to fully occupy and engage the cavity when in juxtaposed spaced apart relationship to each other, to accommodate the shank portion of the strap, as shown in FIG. 5d of the drawings.

The tie straps are disposed so that the bottom end of the shank portions 71 engage the bottom of the channel portion 33 and the corresponding apertures 65 and 67 of the flange plates are aligned with the corresponding apertures of the straps so that the pins 69 can be inserted therethrough to fixedly attach the straps to the plates.

At this position, the posterior tie strap 27a generally adopts its final position, however the anterior tie strap 27b may be able to pivot to some degree about its single pin.

The pedestal 25 is then positioned so that the top of the tie straps are inserted through the tubular confines of the pedestal 25 from the bottom end thereof, whereby due to the precise positioning of the pins and apertures, the anterior tie strap will pivot around its pin 69 so that the anterior longitudinal edge 71b thereof moves into parallel engagement with the anterior end panel 47b as the bottom end of the pedestal is progressively moved towards and ultimately engages the track 29.

Figure 2:
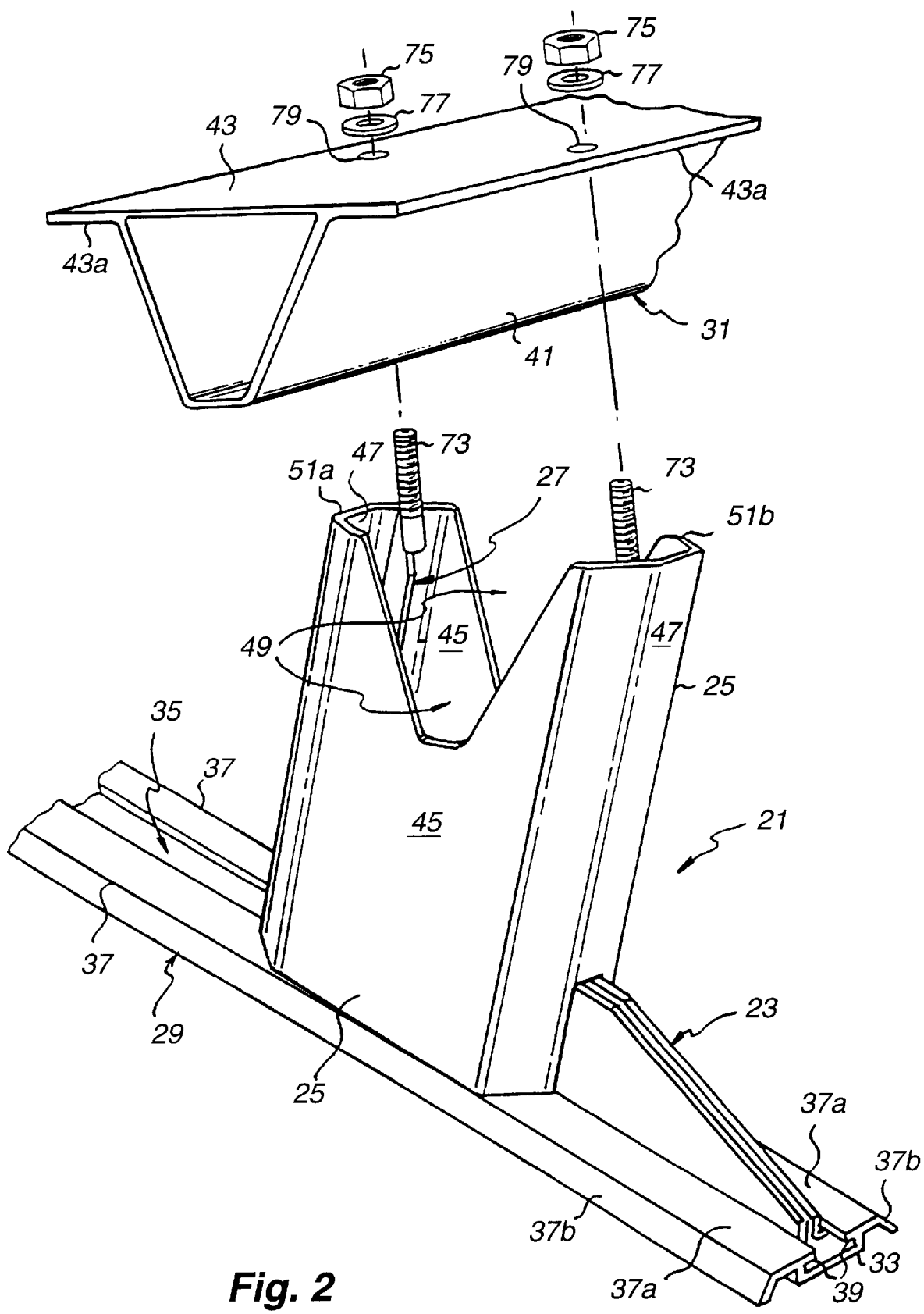
FIG. 2 is an exploded perspective view showing how a seat support beam is mounted to the leg attachment system of the first embodiment.

Importantly, the tongues 59 of the interlocking angles 23 simultaneously engage the rectangular aperture 50 of the posterior end panel 47a, and the leading end of the interlocking angles extend through the recess 52 of the anterior end panel 47b as shown in FIGS. 2 and 3 of the drawings.

Importantly, the geometry of the pin and aperture positions together with the positioning and sizing of the bolt straps and pedestal, automatically causes the engagement between the tongue and the aperture and the parallel arrangement of the tie straps so as to minimise the likelihood of human error in the assembly operation.

At this position, the support beam 31 is then disposed so that the bolt holes 79 are aligned with the bolt stems 73 and the trapezial box channel portion 41 is positioned to sit within the complementary recesses 49 of the pedestal. The nut fasteners 75 and washers 77 can then be inserted and screwed upon the bolt stems 73, clamping the support beam 31, 15 and pedestal 25 into position.

It is important to note that the foot of the interlocking angles 23 fully occupies the cavity 35 of the channel portion 33 of the track to maximise locking engagement with the inner lips 39 of the track, which allows not only increased locking engagement of the support beam and pedestal with the track but also maximises the ability of the leg attachment to resist the application of lateral forces thereto.

The demounting of the leg attachment system is achieved by simply performing the reverse process to the assembly operation.

The operation of the leg attachment system in resisting inertial forces generated by seat components and occupants acting upon such components when the forward momentum of the vessel is suddenly impeded, as would occur in a collision, will now be considered. In such a circumstance, the normal tendency of the leg attachment is to move forwardly about its anchoring points. In the present embodiment, such tendency to move forwardly is opposed by the pin arrangement of the posterior strap, the engagement between the posterior end panel 47a and the posterior tie strap 27a, the engagement between the anterior end panel 47b and the anterior tie strap 27b, and the engagement of the tongue with the bottom edge of the aperture 50. Thus, the anchoring means, pedestal and tie means are all held together and are able to resist vertical movement during application of a lateral force directed at the level of the seat by dissipating the force uniformly through each of these components and not just concentrating the force upon the tie means, as is the case with prior art systems.

Accordingly, there is a reduced tendency to allow small movements of the tie straps which would otherwise tend to change the geometric arrangement of the components, causing an increased load to be placed upon the tie straps for the same external load, increasing shear forces.

In addition, the length and height of the flange plates is increased compared with prior art systems so that the leading ends of the interlocking angles protrude forwardly through the recess 52 to provide an increased engagement length of the anchoring means with the track, whilst maintaining feet clearance for seat occupants of the seats behind. This configuration provides an increased capacity of the leg attachment to resist dislodgement forces during a vessel impact without significantly increasing the weight of the attachment.

By virtue of the leg attachment system of the present embodiment, extremely high impact resistance loadings can be achieved, in excess of 2,100 kg. Accordingly, the present embodiment represents a vast improvement over prior art leg attachment systems.

Figure 6:
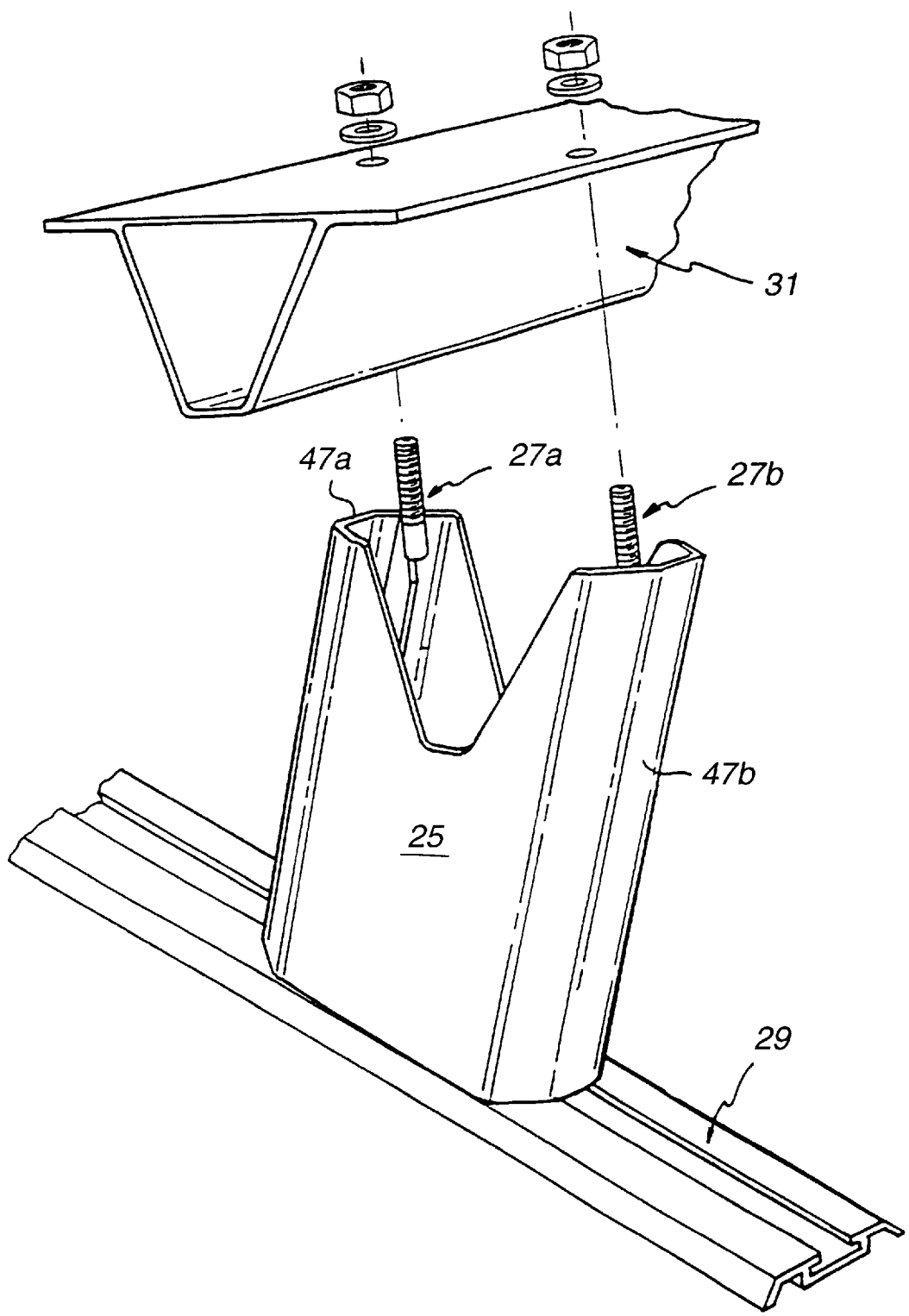
FIG. 6 is a similar view to FIG. 2, but of a leg attachment system in accordance with the second embodiment.
Figure 7:
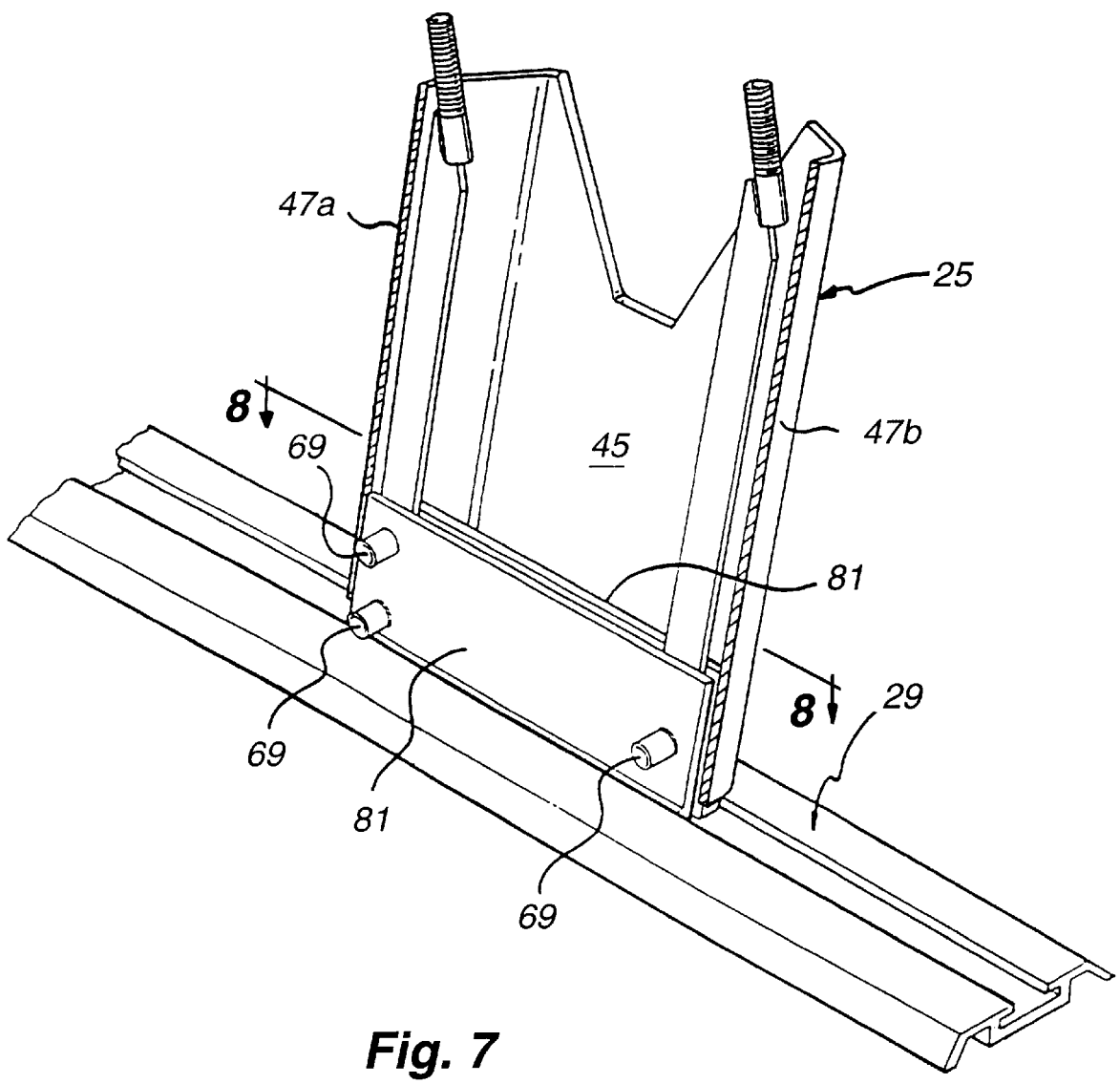
FIG. 7 is a similar view to FIG. 3, but of a leg attachment system in accordance with the second embodiment.
Figure 8:
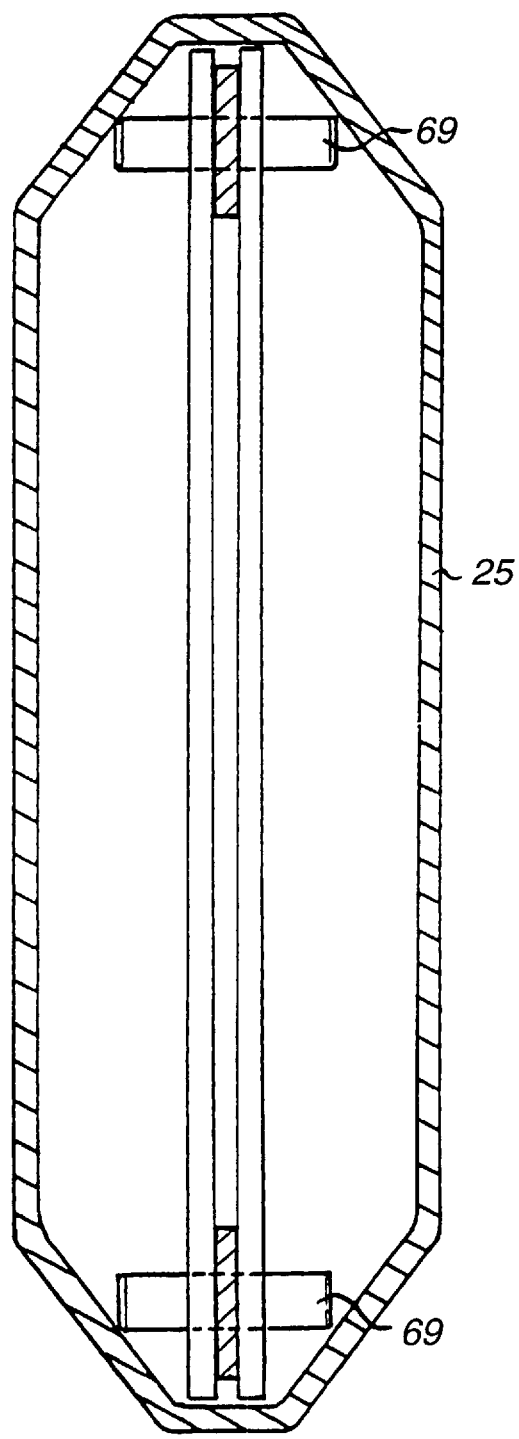
FIG. 8 is a similar view to FIG. 4, but taken along section 8—8 of FIG. 7.
Figures 14, 15:
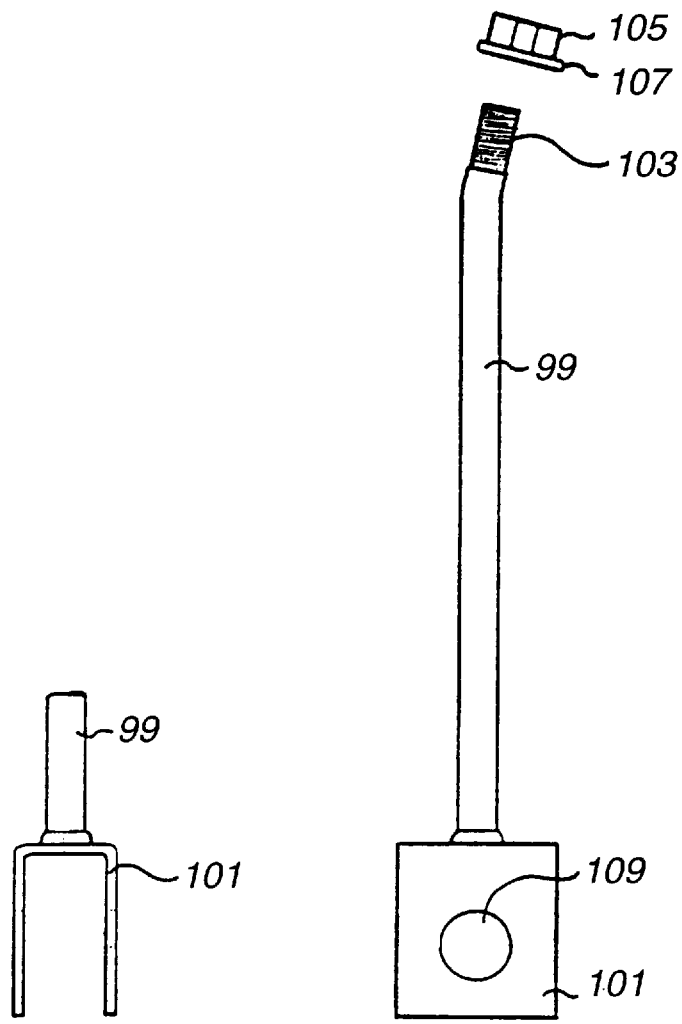
FIG. 14 is side elevation of the tie means in accordance with the third embodiment.
FIG. 15 is a fragmentary side elevation of the tie means shown in FIG. 14.

The second embodiment is substantially similar to the first embodiment except that it is directed towards a demountable leg attachment system as shown in FIGS. 6 and 7, which has an anchoring means confined to the inside of the pedestal for aesthetic, purposes and for applications where impact force resistance requirements are not as great to conform with safety requirements.

As shown in the drawings, the track, support beam, pedestal and tie strap components of the system are substantially identical to those of the previous embodiment. The anchoring means, however, comprises a pair of shortened interlocking angles 81 of commensurate length to the spacing between the end panels 47 of the pedestal 25. Accordingly, the interlocking angles omit the provision of a tongue and a leading protruding end thereof, and the pedestal omits the posterior aperture 50 and the anterior recess 52 thereof. Apart from this, the anchoring means is identical to that of the preceding embodiment.

With the omission of the aforementioned components from the interlocking angles and the pedestal, the configuration of the end panels 47 and the truncated corners thereof become pre-eminent in locating the pedestal centrally upon the interlocking angles, the straps and track, and locking in the pins, web portions and straps during assembly. In this respect, the opposing ends of the web portions sit in abutting engagement with the adjacent planar portions of the end panels so that the longitudinal sides 48 are each disposed adjacent to the outer transverse extent of the spaced web portions at each end thereof, thereby centrally and symmetrically locating the pedestal upon the track.

Although this type of leg attachment system cannot achieve the same impact resistance loads as is the case of the previous embodiment, it still is a vast improvement upon prior art systems, whereby loadings in the order of 1,500 kg are still able to be achieved by this embodiment.

The third embodiment is directed towards a leg attachment system having an alternative form of anchoring means and tie means, as shown in FIGS. 9 to 15 of the drawings.

In this embodiment, the anchoring means comprises a pair of interlocking angles 91 which are of a greater thickness than is the case of the interlocking angles of the preceding embodiments, so as to fully occupy the cavity of the track when disposed in juxtaposed relationship with respect to each other as shown in FIG. 10 of the drawings.

In order to achieve this juxtaposed positioning of the interlocking angles, the angles have to be inserted serially of each other along the track and then be slid along the track together to adopt the juxtaposed corresponding position as shown in FIG. 9 of the drawings.

Furthermore, both of the interlocking angles 91 have a longitudinal extent greater than the spacing between the end panels 47 of the pedestal, as in the case of the first embodiment, however instead of being formed with a tapered leading end, the angles are formed with a rearwardly protruding tapered tail portion 93.

Consequently, the pedestal is formed with a posterior recess 95 within the posterior end panel 47*a* along the bottom edge thereof to accommodate the rearward extension of the interlocking angles through the pedestal.

The leading ends 97 of the interlocking angles are obliquely disposed relative to the bottom longitudinal edge thereof to adopt a parallel relationship, when fitted into position, with the anterior end panel 47*b* of the pedestal. Accordingly, the inner face of the anterior end panel 47*b* is able to be brought into butting relationship with the leading ends 97 of the interlocking angles, as shown in FIG. 9 of the drawings, when assembled.

The web portions 94 of each of the interlocking angles 91 are each provided with a single corresponding aperture 98 disposed at an intermediate position between the anterior end 97 and the tail portion 93 so as to be disposed within the confines of the pedestal when assembled. Accordingly, when the interlocking angles 91 are juxtaposed in corresponding relationship, the apertures 98 of each of the angles are disposed in axial alignment.

The tie means comprises anterior and posterior ties.

The posterior tie comprises a shank portion 99, a U-shaped bracket 101 fixedly mounted to the bottom of the shank portion 99, and a threaded end 103 which forms part of a threaded fastener, the other part comprising a fastener nut 105 and washer 107 as shown in FIG. 12 of the drawings. The U-shaped bracket 101 has a pair of transversely extending apertures 109 disposed therein of corresponding size to the apertures 98 of the interlocking angles. Accordingly, the U-shaped bracket 101 is adapted to surmount the top of the flange plates when disposed in their corresponding juxtaposed position so that the aperture 109 thereof can be disposed in axial alignment with respect to the apertures 98 of the interlocking angles.

Consequently, a removable pin 111 is provided to be inserted axially through the aligned apertures to pivotally and fixedly attach the posterior tie means to the anchoring means.

The anterior tie means comprises a mounting bolt 113, which has a curved threaded bolt stem 115 connected to the top of the anterior end panel 47*b*, to project outwardly from the top of the pedestal 25, orthogonally of the plane of the top of the pedestal.

Similarly, the top of the shank portion 99 is curved so that the threaded end 103 adopts an axial position which is disposed parallel to the threaded stem 115 of the mounting bolt 113. The mounting bolt 113 and the threaded end 103 are arranged so that when disposed in a parallel axial position, they align with the corresponding bolt holes 79 of the support beam 31 so that the support beam can be mounted thereon and accommodated within the recess 49 of the pedestal in a similar manner to the previous embodiments, as shown in FIG. 7 of the drawings.

Assembly of the leg attachment system of the present embodiment is achieved by positioning the interlocking angles 91 into the track and sliding them into the juxtaposed corresponding position as previously described. The posterior tie means is then positioned upon the interlocking angles and the pin 111 inserted through the aligned apertures.

The pedestal 25 is then positioned over the posterior tie means to surmount the anchoring means and to sit upon the track.

The anterior tie means comprising the mounting bolt is then inserted into position and the support beam is located upon the threaded ends of the respective anterior and posterior ties. The fastening nuts and washers are then screwed onto the respective threaded ends of the ties, and the support beam, pedestal and anchoring means are all locked into position.

The above arrangement, although providing impact resistance loads in excess of the prior art and meeting minimum standards of the International Maritime Organisation, is somewhat inferior to the leg attachment systems described in the preceding embodiments.

The principal reason for this is that the posterior tie means takes most of the impact load upon application of a lateral force, and hence is not as efficient in distributing the load to the foot of the anchoring means and to the pedestal as is the case in the preceding embodiments. Consequently, the impact load resistance of this form of leg attachment system is principally limited by the strength of the shank portion to resisting shear forces applied principally at the fastener end.

Notwithstanding the above, it should be appreciated that the present embodiment still represents a significant advance over prior art leg attachment systems and can have utility where this type of leg attachment system is preferred to that of the preceding embodiments.

It should be appreciated that the scope of the present invention is not limited to the particular embodiments herein described and that changes and modifications to the embodiments can be made without departing from the spirit or scope of the invention.

Figure 16A:
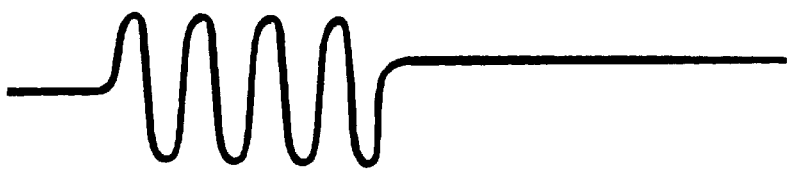
FIG. 16a is a side elevation of a preform metal strap in accordance with an alternative embodiment.
Figure 16B:
Figure 17:
FIG. 17 is a plan view of a preform metal strap in accordance with another alternative embodiment.

Moreover, where it is desirable to achieve an increased dampening effect on the resistance of the leg attachment system to impact or inertial forces applied to the seat, modifications can be made to the tie means and anchoring means to provide the same. One way of achieving this is to replace the posterior tie strap of the first and second embodiments with a structural member which extends inelastically under tensile loads beyond the normal load range during service. Such a device may be a preformed metal strap having a concertinaed shank portion as illustrated in FIGS. 16a and 16b of the drawings, or an alternative metal strap having a perforated shank portion as illustrated in FIG. 17 of the drawings.

Attachment of either of these extensible straps can be conveniently accommodated between the two interlocking angles using a simple arrangement of pins as described in the preceding embodiments.

Figure 18B:
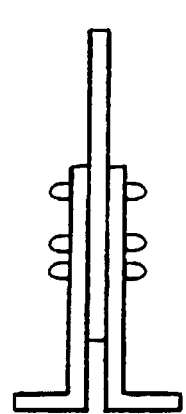
Figure 18A:
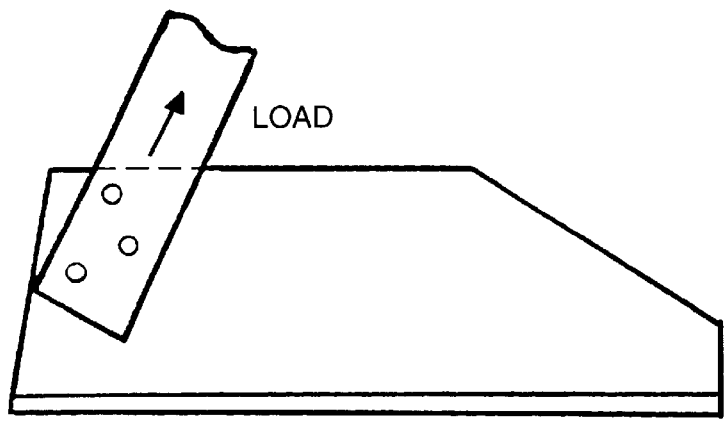
FIG. 18a is a diagrammatic side elevation showing the interconnection of an anchoring means and a tie means using a deformable pin arrangement as described in another modified embodiment.
Figure 19:
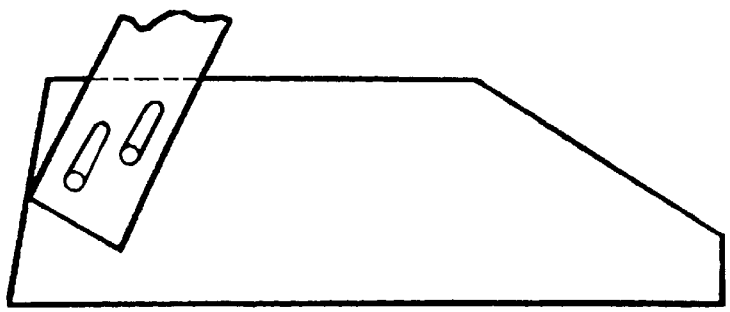
FIG. 19 is a similar diagrammatic view to FIG. 16a but depicting an arrangement using pins in deformable slots.

In a further modification to the embodiments, an inextensible strap could be fastened by deformable pins as illustrated in FIGS. 18a and 18b of the drawings, or deformable slots as illustrated in FIG. 19, or deformable interlocking angles to allow controlled movement of the seat leg assembly at defined loads, but without separation of the components.

A further modification would be a combination using either of the two aforementioned modifications.

We claim:

1. A leg attachment for seats mounted to a seat support, including:
    an anchoring means for lockingly engaging a base having a track therein, said base being fixedly mounted to a support;
    leg means for surmounting said anchoring means and supporting a seat support thereon; and
    tie means having a first end and a second end for releasable fixed attachment to said anchoring means at said first end and clamped locking engagement to the seat support at said second end, such that increased locking engagement of said tie means with the seat support positively locks said leg means relative to said anchoring means and said base;
    wherein lateral forces applied to the seat support are transferred by said leg means and said tie means to said anchoring means, whilst simultaneously being disseminated through said leg means;
    and wherein said anchoring means is adapted to dissipate the force transferred thereto substantially uniformly over an expansive portion of the base.

2. A leg attachment as claimed in claim 1 wherein, said anchoring means comprises a pair of interlocking angles, each having an outer flanged end, for being positively engaged within a longitudinally extending cavity centrally disposed within and circumscribed by a C-shaped channel portion of the track, and a substantially planar web portion for projecting outwardly from the cavity; wherein said flanged ends combinedly define a T-shaped foot for locking engagement within the cavity and said web portions define a leg for attachment to said tie means, when said interlocking angles are brought into juxtaposition with each other.

3. A leg attachment as claimed in claim 2, wherein, a combined transverse extent of said flanged ends is marginally less than a corresponding maximal transverse extent of the cavity, and a combined transverse extent of the web portions proximate to said foot is marginally less than a minimal transverse extent of the cavity, so that said interlocking angles are required to be transversely spaced apart a prescribed distance to fully occupy and engage said cavity when in said juxtaposition, to enable one interlocking angle to be discretely withdrawn from engagement with the track by lateral rotation thereof relative to the other interlocking angle.

4. A leg attachment as claimed in claim 3, wherein said leg means comprises a tubular pedestal having a base end for sitting upon the track whilst surmounting said anchoring means, and an opposing support end formed with a transversely extending recess of complementary shape to the seat support to accommodate a longitudinal portion of the seat support, transversely across said pedestal, said pedestal being of substantially rectangular form having a pair of opposing side panels interconnected by a pair of opposing end panels, and wherein the corners between said side panels and end panels are truncated such that the breadth of said end panels is commensurate to said combined transverse extent of said web portions, so as to locate said pedestal centrally and symmetrically upon the track when surmounting said anchoring means.

5. A leg attachment as claimed in claim 4, wherein said pedestal is formed with a rectangular aperture in a posterior end panel thereof, a prescribed distance from a bottom end of said pedestal, and said web portions are stepped at posterior ends thereof to define an outwardly projecting tongue correspondingly sized to repose within said rectangular aperture.

6. A leg attachment as claimed in claim 4, wherein said pedestal is formed with a rectangular recess in an anterior end panel thereof at a bottom end of said pedestal, said rectangular recess extending a prescribed distance from said bottom end to terminate at a prescribed height corresponding to a top of said interlocking angles thereat and said interlocking angles have a length longer that a distance between said end panels, being provided with tapered anterior ends extending anteriorly beyond the said pedestal through said rectangular recess so that said pedestal surmounts both said interlocking angles simultaneously.

7. A leg attachment as claimed in claim 2, wherein, said web portions are each provided with a corresponding transversely extending aperture to facilitate attachment to said tie means.

8. A leg attachment as claimed in claim 7, wherein said first end is able to be releasably pinned to said anchoring means by means of a pin inserted through corresponding apertures of said web portions and said one end when brought into relative axial alignment.

9. A leg attachment as claimed in claim 8, wherein the length of said pin is commensurate to the corresponding transverse spacing between said panel sides.

10. A leg attachment as claimed in claim 7, wherein a pair of said apertures is disposed anteriorly of said web portions and a further aperture is disposed forwardly of said web portions, relative to said track, said pair of apertures being disposed in horizontally spaced relation to each other to strengthen the attachment of said web portions to said tie means.

11. A leg attachment as claimed in claim 1, wherein said leg means comprises a tubular pedestal having a base end for sifting upon the track whilst surmounting said anchoring means, and an opposing support end formed with a transversely extending recess of complementary shape to the seat support to accommodate a longitudinal portion of the seat support, transversely across said pedestal.

12. A leg attachment as claimed in claim 11, wherein said tie means comprises a shank portion for extending along and within said pedestal, said first end having a transversely extending aperture for aligning with corresponding apertures of said anchoring means to facilitate attachment thereto.

13. A leg attachment as claimed in claim 12, wherein said shank portion comprises a strap of commensurate transverse extent at said first end to a prescribed distance for being disposed interposedly between said web portions, so as to maintain locking engagement of said foot with the track.

14. A leg attachment as claimed in claim 11, wherein said second end of said tie means is formed with a screw threaded fastening means for locating within a corresponding aperture disposed upon said seat support and for clampingly and lockingly engaging the seat support positively upon said pedestal within said recess on increased locking engagement of said fastening means upon the seat support.

15. A leg attachment system for seats mounted to a seat support, including:
 a base having a track for fixed mounting to a support; and
 a leg attachment including:
  (i) an anchoring means for lockingly engaging said track;
  (ii) leg means for surmounting said anchoring means and supporting a seat support thereon; and
  (iii) tie means having a first end a second end, for releasable fixed attachment to said anchoring means at said first end and clamped engagement to the seat support at said second end, such that increased locking engagement of said tie means with the seat support positively locks said leg means relative to said anchoring means and said base;
 wherein lateral forces applied to the seat support are transferred by said leg means and said tie mans to said anchoring means, whilst simultaneously being disseminated through said leg means;
 and wherein said anchoring means is adapted to dissipate the force transferred thereto uniformly over an expansive portion of said base.

16. A method of forming a leg attachment system for seats, comprising:
 fixedly mounting a base having a track therein to a support;
 inserting anchoring means into said track to lockingly engage therewith;
 releasedly attaching tie means to said anchoring means, so that said tie means can project upwardly therefrom;
 surmounting a leg means for supporting a seat support, over said anchoring means so that said tie means is disposed within the leg means and can extend therealong;
 positioning a seat support upon said leg means and locating a portion of said tie means to extend through said seat support; and
 clampingly engaging said seat support to said leg means by locking engagement of said tie means with said seat support, and consequently clampingly engaging said leg means upon said track;
 wherein lateral forces applied to said seat support are transferred by said leg means and said tie means to said anchoring means, whilst simultaneously being disseminated through said leg means;
 and wherein forces transferred to said anchoring means are dissipated uniformly over an expansive portion of said base.

* * * * *

UNITED STATES PATENT AND TRADEMARK OFFICE
CERTIFICATE OF CORRECTION

PATENT NO. : 5,890,768
DATED : April 6, 1999
INVENTOR(S) : Rodney William Beuteaux, et al.

It is certified that error appears in the above-identified patent and that said Letters Patent is hereby corrected as shown below:

Column 5, line 20, delete "FIGS. 1 and 1a-1c" and substitute therefore --FIG. 1--.

Figure 1A:
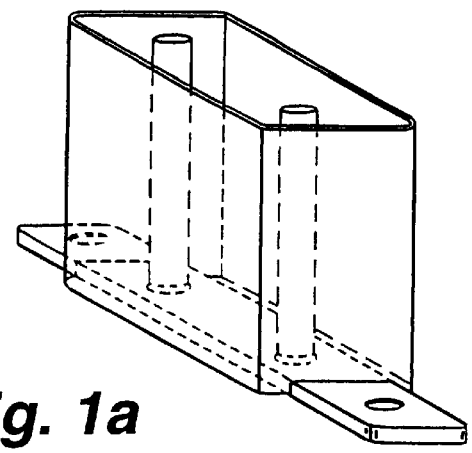
Figure 1B:
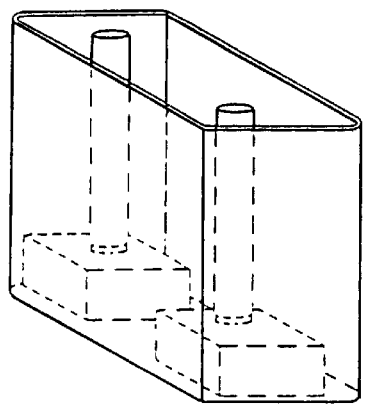
Figure 1C:
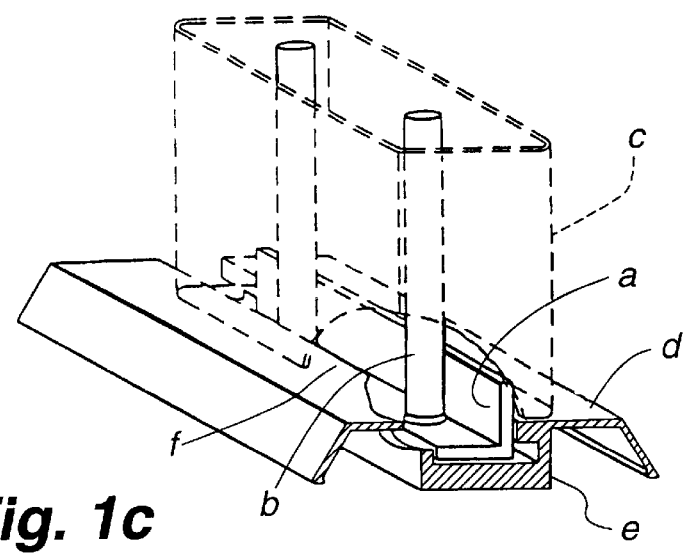

Column 5, between lines 19 and 20, insert --FIGS. 1a-1c are perspective views of a leg attachment system according to the prior art.--.

Signed and Sealed this

Twenty-ninth Day of June, 1999

*Attest:*

Q. TODD DICKINSON

*Attesting Officer*  *Acting Commissioner of Patents and Trademarks*